US009088798B2

(12) United States Patent
Kato et al.

(10) Patent No.: US 9,088,798 B2
(45) Date of Patent: Jul. 21, 2015

(54) IMAGE ENCODING DEVICE AND IMAGE DECODING DEVICE

(71) Applicant: KDDI Corporation, Tokyo (JP)

(72) Inventors: Haruhisa Kato, Saitama (JP); Akio Yoneyama, Saitama (JP)

(73) Assignee: KDDI Corporation, Tokyo (JP)

(*) Notice: Subject to any disclaimer, the term of this patent is extended or adjusted under 35 U.S.C. 154(b) by 0 days.

(21) Appl. No.: 14/386,905

(22) PCT Filed: Mar. 18, 2013

(86) PCT No.: PCT/JP2013/057620
§ 371 (c)(1),
(2) Date: Sep. 22, 2014

(87) PCT Pub. No.: WO2013/146405
PCT Pub. Date: Oct. 3, 2013

(65) Prior Publication Data
US 2015/0049956 A1    Feb. 19, 2015

(30) Foreign Application Priority Data

Mar. 26, 2012  (JP) ................................. 2012-069240

(51) Int. Cl.
*G06K 9/36* (2006.01)
*H04N 19/51* (2014.01)
(Continued)

(52) U.S. Cl.
CPC .............. *H04N 19/51* (2014.11); *H04N 19/50* (2014.11); *H04N 19/61* (2014.11)

(58) Field of Classification Search
CPC ....... H04N 19/50; H04N 19/61; H04N 19/51; H04N 19/176; H04N 19/13; H04N 19/159; H04N 19/593; H04N 19/11; H04N 19/129; H04N 19/46; H04N 19/60; H04N 19/196; H04N 19/91; H04N 19/122; H04N 19/132; H04N 19/14; H04N 19/157; H04N 19/85; H04N 19/96; H04N 19/102; H04N 19/103; H04N 19/136; H04N 19/187; H04N 19/19; H04N 19/33; H04N 19/44; H04N 19/463; H04N 19/59; H04N 19/625; H03M 7/40; H03M 7/408; H03M 7/42
USPC ...................................................... 382/233
See application file for complete search history.

(56) References Cited

U.S. PATENT DOCUMENTS 6,646,578 B1 * 11/2003 Au ................................. 341/67
2006/0088102 A1 * 4/2006 Lee et al. .................. 375/240.16
(Continued)

FOREIGN PATENT DOCUMENTS

JP          H0723232 A       1/1995
(Continued)

OTHER PUBLICATIONS

International Preliminary Report on Patentability and Written Opinion for PCT Application No. PCT/JP2013/057620, dated Oct. 1, 2014, 11 pages.
(Continued)

*Primary Examiner* — Ali Bayat
(74) *Attorney, Agent, or Firm* — Westman, Champlin & Koehler, P.A.

(57) ABSTRACT

Provided are an image encoding device that has high encoding efficiency, and an image decoding device. A mapping means maps pixel signals of an object to be encoded that are configured in prescribed color space to mapped pixel signals in which redundancy between the signals is reduced. The mapping coefficients are calculated from encoded pixel signals, thereby making encoding of mapping coefficients unnecessary. Furthermore, the mapping coefficients are calculated from pixel signals of an adjacent block comprising pixels similar to the pixels of the block to be encoded/decoded, thereby reducing redundancy significantly. The mapping is applied to the pixel signals of the block to be encoded/decoded and to an area of pixels to be referred to by prediction information, thereby enabling prediction to be applied to the mapped pixel signals, and, after executing transformation/quantization, encoding and inverse transformation/dequantization are executed. The mapped pixel signals are restored to the pixel signals.

10 Claims, 3 Drawing Sheets

(51) Int. Cl.
*H04N 19/50* (2014.01)
*H04N 19/61* (2014.01)

(56) References Cited

U.S. PATENT DOCUMENTS

| | | | |
|---|---|---|---|
| 2012/0170662 A1* | 7/2012 | Karczewicz et al. | .... 375/240.18 |
| 2012/0236931 A1* | 9/2012 | Karczewicz et al. | .... 375/240.02 |
| 2013/0003859 A1* | 1/2013 | Karczewicz et al. | .... 375/240.24 |

FOREIGN PATENT DOCUMENTS

| | | |
|---|---|---|
| JP | H07154605 A | 6/1995 |
| JP | H08186817 A | 7/1996 |
| JP | 2011188368 A | 9/2011 |

OTHER PUBLICATIONS

International Search Report for PCT/JP2013/057620, dated Apr. 16, 2013, 5 pages.
Kato, Haruhisa et al., "Improved Video Coding Method Based on Adaptive Basis Function for Transforming Intra Prediction Error in H.264", The Journal of the Institute of Image Information and Television Engineers, Feb. 1, 2011, vol. 65, No. 2, pp. 229-234; 8 total pages.
Non Patent reference cited in instant specification, http://www.jpo.go.jp/shiryou/s_sonota/map/denki14/2/2-1-2-1.htm, 4 pages.
Non Patent reference cited in instant specification, http://www.jpo.go.jp/shiryou/s_sonota/map/denki14/2/2-1-3. htm, 4 pages.

* cited by examiner

Fig.3
(1) BLOCK TO BE ENCODED (DECODED) AND SURROUNDING ENCODED (DECODED) BLOCK
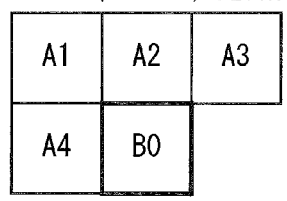
(2) WHEN PREDICTION MODE IS 0
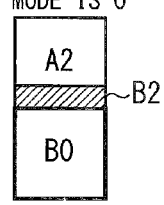
(3) WHEN PREDICTION MODE IS 1
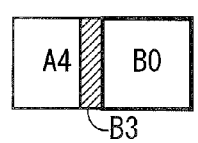
(4) WHEN PREDICTION MODE IS 2
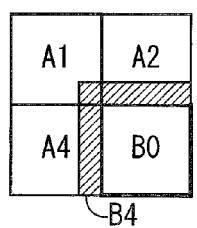
(5) WHEN MOTION PREDICTION IS CONCERNED
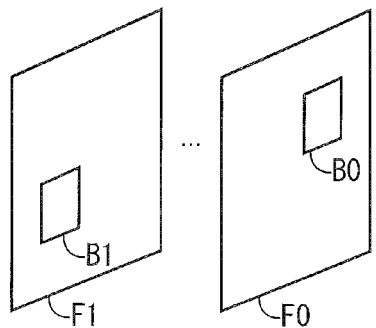

IMAGE ENCODING DEVICE AND IMAGE DECODING DEVICE

CROSS-REFERENCE TO RELATED APPLICATION

This Application is a Section 371 National Stage Application of International Application No. PCT/JP2013/057620, filed 18 Mar. 2013 and published as WO 2013/146405 A1 on 3 Oct. 2013, in Japanese, the contents of which are hereby incorporated by reference in their entirety.

TECHNICAL FIELD

The present invention relates to an image encoding device and an image decoding device, and more particularly, relates to an image encoding device for encoding a pixel to be encoded, where a mapping coefficient for reducing a correlation between signals is calculated from an encoded pixel and then the calculated mapping coefficient is applied to the pixel to be encoded, and relates also to an image decoding device.

BACKGROUND ART

There has been a method for reducing temporal redundancy, a method for reducing spatial redundancy, and a method for reducing signal redundancy as a method for improving encoding efficiency in the conventional image encoding.

A frame difference method or a motion compensation method is adopted as a method for reducing temporal redundancy. In the frame difference method, a simple subtraction between successive two images is performed, and the obtained difference is encoded. In the motion compensation method, a motion vector is applied to a reference frame, so that an approximate image of a frame to be encoded is generated, and a difference between the approximate image and the frame to be encoded is encoded. Since this method reduces a difference between images and encodes the difference, the motion compensation method is more advantageous than the frame difference method in terms of the encoding efficiency. Various methods have been proposed as a method for estimating a motion vector used in the motion compensation method, and a primary conventional technology relating to an estimation of a motion is described in Non-Patent Literature 1.

On the other hand, as a method for reducing spatial redundancy, there is a method for quantizing an orthogonal transformation coefficient. The orthogonal transformation maps a pixel signal to a frequency region so that the energy is concentrated in the lower band. Indiscriminating of visual characteristics of humans to the high band is used and a high band component is removed by the quantization so that the encoding efficiency can be improved. Further, there is a spatial redundancy reduction method by estimation of an orthogonal transformation coefficient or pixel. A primary conventional technology relating to the orthogonal transformation is described in Non-Patent Literature 2.

As a method for reducing signal redundancy, there is a method for reducing a correlation between signals by a principal component analysis. In Patent Literature 1, an encoding processing is applied to a decorrelated signal to generate an encoding signal. In another example of the same Literature, there is also described a method for executing a decorrelation inverse transformation by specifying a decorrelation transformation matrix in accordance with assistant information indicating a unique number of a decorrelation transformation matrix, where the number is decided by selecting the decorrelation transformation matrix closest to a decorrelation transformation matrix evaluated by using a principal component analysis method at an encoding side from a finite number of decorrelation transformation matrices.

CITATION LIST

Patent Literature

Patent Literature 1 Japanese Published Unexamined Patent Application No. 2011-188368

Non-Patent Literature

Non-Patent Literature 1 http://www.jpo.go.jp/shiryou/s_sonota/map/denki14/2/2-1-2-1.htm
Non-Patent Literature 2 http://www.jpo.go.jp/shiryou/s_sonota/map/denki14/2/2-1-3.htm

SUMMARY OF INVENTION

Technical Problem

In the motion compensation, the temporal redundancy is reduced; however, this cannot be applied to a still image. On the other hand, a combination between the orthogonal transformation and the quantization or the spatial estimation method reduces the spatial redundancy; however, either method independently processes a color signal, and thus, it is not possible to reduce the redundancy of the color signal.

In Patent Literature 1 in which the signal redundancy is reduced, information on the decorrelation matrix used for decorrelation transformation is held as a decorrelation parameter, and thus, it is difficult to greatly improve the encoding efficiency. In the example where the approximate matrix is used, even if it is possible to greatly reduce an amount of information to be transferred, it is not sufficient to reduce the redundancy by the decorrelation.

An object of the present invention is to resolve the problems in the above-described conventional technology and to provide an image encoding device with a high encoding efficiency. Another object of the present invention is to provide an image decoding device corresponding to the image encoding device with a high encoding efficiency.

Solution to Problem

In order to accomplish the object, the feature of the present invention is that an image encoding device for encoding, for each unit block, a pixel signal of a pixel to be encoded, where the pixel is configured by a predetermined color space, into a form of a mapping pixel signal mapped into a space for reducing a correlation between signals, the device comprising: mapping means for applying, to a pixel signal to be encoded, a mapping coefficient for reducing a correlation between the signals, where the mapping coefficient is calculated from an encoded pixel signal, to obtain a mapping pixel signal; predicting means for determining prediction information for predicting a mapping pixel signal to be encoded, from the mapping pixel signal of the encoded pixel signal; compensating means for generating a prediction signal of the mapping pixel signal to be encoded, on the basis of the prediction information; difference means for performing difference processing between the mapping pixel signal to be encoded and a prediction signal thereof to obtain a prediction residual signal; transforming means for performing an orthogonal transformation on the prediction residual signal to obtain a transformation coefficient; quantizing means for quantizing the transformation coefficient in accordance with the mapping coefficient to obtain a quantization value; encoding means for encoding the quantization value and the prediction information; inverse quantizing means for performing an inverse quantization on the quantization value to obtain a transformation coefficient; inverse transforming means for performing inverse orthogonal transformation on the transformation coefficient to obtain a prediction residual signal; adding means for adding the prediction residual signal and the prediction signal to obtain an encoded mapping pixel signal; and inverse mapping means for applying the mapping coefficient, as inverse mapping, to the encoded mapping pixel signal to obtain an encoded pixel signal, wherein the mapping means calculates the mapping coefficient from an encoded pixel signal in a predetermined region including a region to which the prediction information refers, and applies the mapping coefficient to the encoded pixel signal in the predetermined referred region when the mapping coefficient is applied to the pixel signal to be encoded, and the predicting means predicts the mapping pixel signal to be encoded, from the encoded mapping pixel signal in the predetermined region by the applied mapping coefficient.

Also, in order to accomplish the object, the feature of the present invention is that an image decoding device for decoding, for each unit block, information encoded by the image encoding device, into the pixel signal configured by the predetermined color space, the device comprising: decoding means for decoding the encoded quantization value and the prediction information; decoding-side inverse quantizing means for performing an inverse quantization on the quantization value to obtain a transformation coefficient; decoding-side inverse transforming means for performing inverse orthogonal transformation on the transformation coefficient to obtain a prediction residual signal; decoding-side compensating means for generating a prediction signal of a mapping pixel signal for a pixel signal to be decoded, from a mapping pixel signal obtained from the decoded pixel signal and the prediction information; decoding-side adding means for adding the prediction signal and the prediction residual signal to obtain the decoded mapping pixel signal; decoding-side mapping means for calculating the mapping coefficient from the decoded pixel signal in a predetermined region including a region to which the prediction information refers, and decoding-side inverse mapping means for applying the calculated mapping coefficient, as inverse mapping, to the decoded mapping pixel signal to obtain the decoded pixel signal, wherein the decoding-side mapping means applies the mapping coefficient to the decoded pixel signal in the predetermined region to obtain the mapping pixel signal that is used together with the prediction information when the decoding-side compensating means generates the prediction signal and is obtained from the decoded pixel signal.

Advantageous Effects of Invention

According to the present invention, a mapping coefficient used when mapping a pixel signal to be encoded and decoded, where the pixel signal is configured by a predetermined color space, to a mapping pixel signal for reducing redundancy between signals is calculated from an encoded pixel signal. Thus, it is possible to eliminate a need of encoding a mapping coefficient. Further, the mapping coefficient is calculated from a predetermined region including a reference region of prediction information that can be regarded as a similar pixel of a block to be encoded and decoded. Thus, the redundancy is greatly reduced. As a result, an encoding efficiency is improved. Further, when the mapping is applied to the pixel signal in the subject block and a region of pixels to which the prediction information refers, the mapping pixel signal is further made capable of applying a prediction. As a result, the encoding efficiency is improved.

BRIEF DESCRIPTION OF DRAWINGS

FIG. 3 is a diagram for describing a specific application example of mapping means, etc.

DESCRIPTION OF EMBODIMENTS

Figure 1:
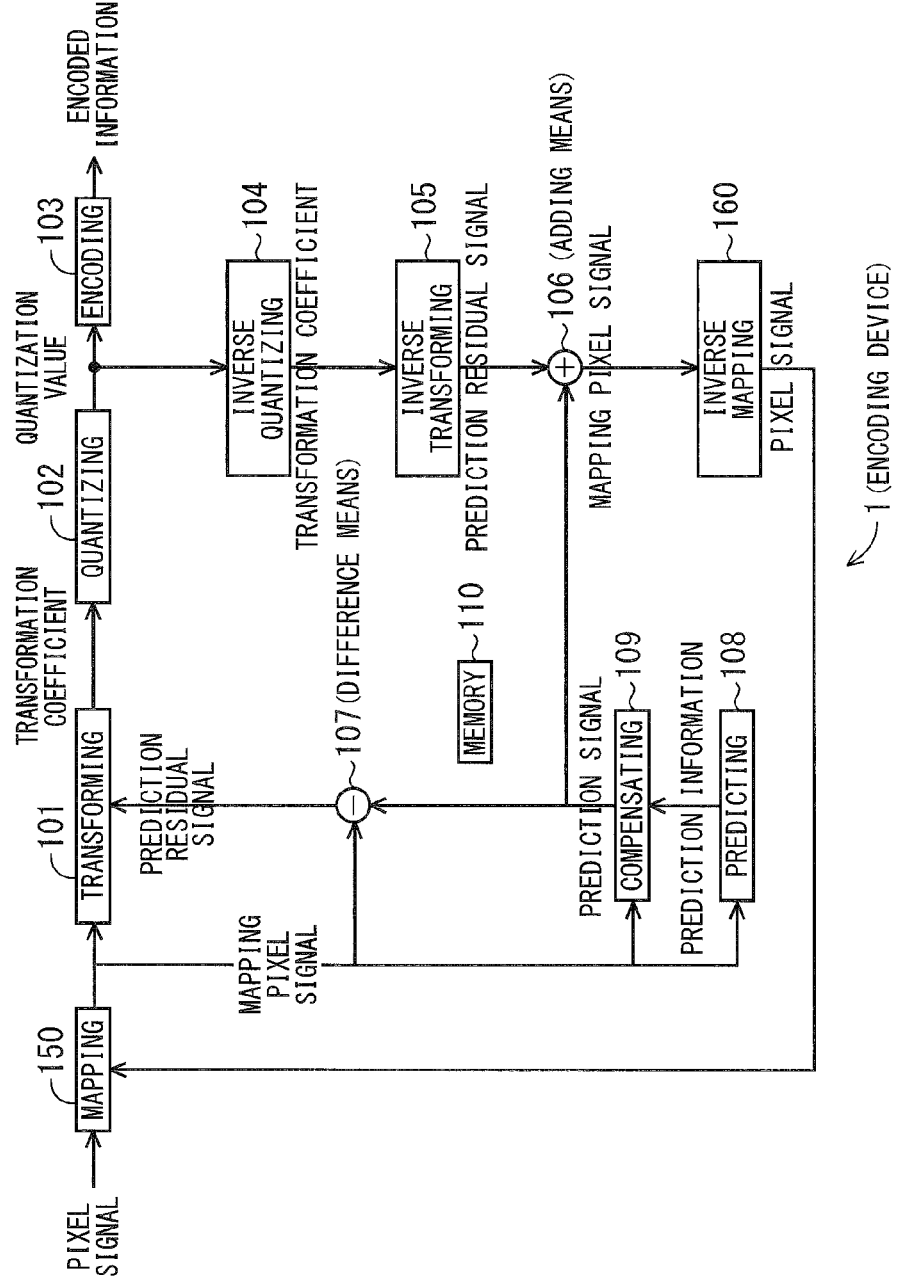
FIG. 1 is a functional block diagram of an encoding device according to one embodiment.

FIG. 1 is a functional block diagram of an (image) encoding device according to one embodiment of the present invention. An encoding device 1 includes: transforming means 101; quantizing means 102; encoding means 103; (encoding-side) inverse quantizing means 104; (encoding-side) inverse transforming means 105; (encoding-side) adding means 106; difference means 107; predicting means 108; (encoding-side) compensating means 109; an (encoding-side) memory 110; (encoding-side) mapping means 150; and (encoding-side) inverse mapping means 160, and encodes a pixel signal for each unit block for encoding.

Figure 2:
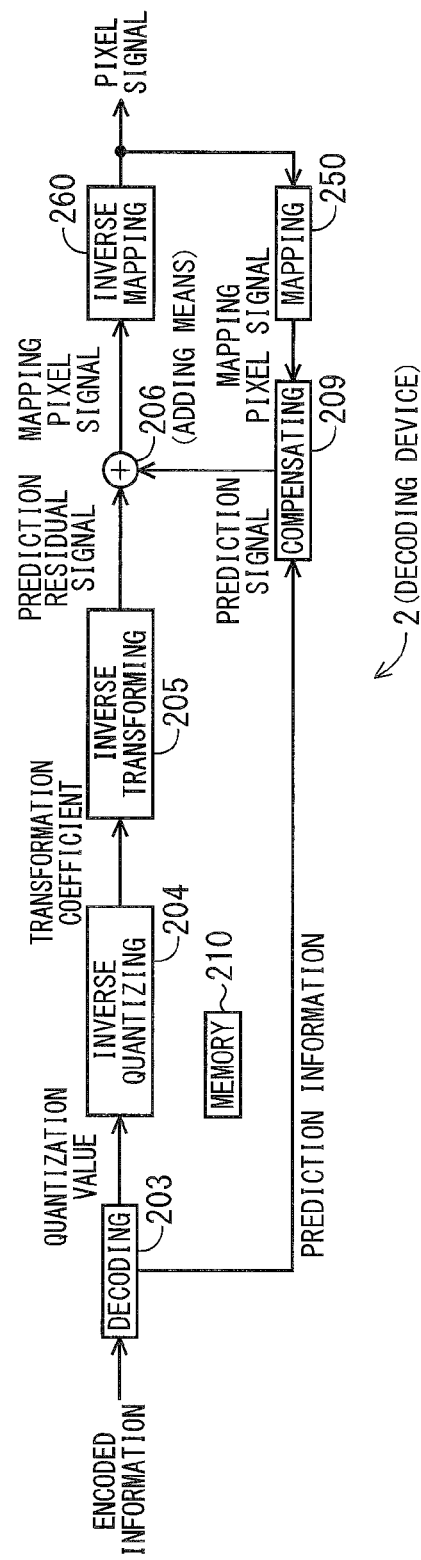
FIG. 2 is a functional block diagram of a decoding device according to one embodiment.

FIG. 2 is a functional block diagram of an (image) decoding device, corresponding to the encoding device in FIG. 1, according to one embodiment of the present invention. A decoding device 2 includes: decoding means 203; (decoding-side) inverse quantizing means 204; (decoding-side) inverse transforming means 205; (decoding-side) adding means 206; (decoding-side) compensating means 209; a (decoding-side) memory 210; (decoding-side) mapping means 250; and (decoding-side) inverse mapping means 260, and decodes a pixel signal for each unit block.

In addition, the size for the unit block for encoding and decoding may be arbitrarily set. After defining the unit block, encoding and decoding may be further performed for each predetermined small region obtained by subdividing the unit block.

Each function block in FIG. 1 and FIG. 2 will be described, below. In addition, when a processing for each function block in FIG. 1 and FIG. 2 is identical or corresponds to each other, one constituent component may only be described with the other constituent component being described with brackets, for the sake of simplicity, where appropriate, such as "mapping means 150 (mapping means 250)." Further, a common designation is given to function blocks in FIG. 1 and FIG. 2 when a processing is identical or corresponds to each other, and a lower two digits are in common as a reference number.

In addition, in FIG. 1 (and FIG. 2), the memory 110 (and the memory 210) each holds an encoded pixel signal (decoded pixel signal) and an encoded mapping pixel signal (decoded mapping pixel signal) required by each function block of the encoding device 1 (and the decoding device 2) for a required period and presents the signal as required for each function block to perform processing; however, an arrow representing a flow of data exchange at that time is not shown for simplicity in the figure. The holding and exchanging of the data will be described where appropriate.

The mapping means 150, which is a characteristic configuration of the present invention, (1) maps, for each unit block for encoding, the input pixel signal to be encoded from an initially input signal in a predetermined color space to a signal in a particular space where correlation between signals is reduced to reduce redundancy (referred to as "mapping pixel signal"), and hands over the mapped signal to the transforming means 101, the compensating means 109, and the predicting means 108. The mapping means 150 also (2) evaluates a mapping coefficient representing the mapping in order to perform the mapping (1). It is possible to evaluate the mapping coefficient evaluated in (2) by using the encoded pixel signal held in the memory 110 without using the unit block itself to be encoded, which is actually transformed in (1), and thus, it is not necessary to encode information on the mapping coefficient.

When the initially input pixel signal is an RGB signal, the RGB signal is transformed into the mapping pixel signal in a particular space αβγ evaluated in (2). Generally, a different αβγ space is evaluated for each unit block to be encoded, which is transformed in (1).

The mapping means 250 performs a processing similar to that described in (2) by the mapping means 150, on the decoded pixel signal that is transmitted from the inverse mapping means 260 and is held in the memory 210 to thereby evaluate a similar mapping coefficient. The mapping means 250 also applies the mapping coefficient to a decoded pixel signal in a region designated by the prediction information transmitted from the decoding means 230, out of the decoded pixel signals held in the memory 210, and evaluates the mapping pixel signal. The evaluated mapping pixel signal is used by the compensating means 209 for generating a prediction signal from the prediction information.

The inverse mapping means 160 (inverse mapping means 260) performs an inverse processing, of the mapping means 150 (mapping means 250), on the mapping pixel signal transmitted from the adding means 106 (adding means 206) to evaluate a pixel signal and records the same in the memory 110 (memory 210) so that the mapping means 150 (mapping means 250) is referable thereto, where appropriate in the following processing.

In addition, the mapping coefficient evaluated by the mapping means 150 (mapping means 250) on the basis of a predetermined pixel signal is immediately made available also in the inverse mapping means 160 (inverse mapping means 260) through a flow of data exchange (not shown), where it becomes possible to perform inverse mapping by using the mapping coefficient. Further, the mapping means 150 (mapping means 250) and the inverse mapping means 160 (inverse mapping means 260) will be described in detail later.

The transforming means 101 transforms, by the orthogonal transformation, a prediction residual signal in the mapping pixel signal transmitted from the difference means 107 described later and the mapping pixel signal transmitted from the mapping means 150, into a transformation coefficient of a frequency region. The transformation coefficient obtained by the orthogonal transformation is transmitted to the quantizing means 102. As the orthogonal transformation, DCT (Discrete Cosine Transform) or approximate transformation of the DCT, or DWT (Discrete Wavelet Transform), etc., may be used.

In addition, a case where the transforming means 101 performs transformation on the mapping pixel signal transmitted from the mapping means 150, rather than on the prediction residual signal is generated when it is not possible to apply prediction because of a first block within a frame during the use of an intra-prediction.

The quantizing means 102 quantizes the transformation coefficient transmitted from the transforming means 101. The quantization value obtained by the quantization is transmitted to the inverse quantizing means 104 and the encoding means 103. Quantization parameters used for the quantizing processing may be set as a combination of constant values. Alternately, when the quantization parameter is controlled in accordance with an information amount of the transformation coefficient, an encoding efficiency can be improved.

In the quantization parameter, or as described in detail later, to the transformation coefficient in each mapped space axis, a quantization parameter uneven in accordance with an element (eigenvalue) of a diagonal matrix representing an information amount of the space axis can be set (a quantization parameter larger in an axis with a larger amount of information can be set) and can be encoded.

The encoding means 103 encodes the quantization value (and the quantization parameter) transmitted from the quantizing means 102 and outputs the same as encoded information. A variable length code or arithmetic code, which removes redundancy between codes, can be used for the encoding.

The decoding means 203 goes through the inverse steps of the encoding processing to decode the input encoded information (output from the encoding means 103 of the encoding device 1). The decoded quantization value (and the quantization parameter) and the prediction information are transmitted to the inverse quantizing means 204 and the compensating means 209, respectively.

The inverse quantizing means 104 (inverse quantizing means 204) goes through the inverse steps of the quantizing processing to inversely quantize the quantization value transmitted from the quantizing means 102 (decoding means 203). The transformation coefficient that contains a quantization error obtained by the inverse quantization is transmitted to the inverse transforming means 105 (inverse transforming means 205).

The inverse transforming means 105 (inverse transforming means 205) goes through the inverse steps of the orthogonal transformation so as to perform inverse orthogonal transformation of the transformation coefficient including the quantization error transmitted from the inverse quantizing means 104 (inverse quantizing means 204). The mapping pixel signal or the prediction residual signal including the quantization error obtained by the inverse transformation is transmitted to the adding means 106 (adding means 206) described later.

The adding means 106 (adding means 206) calculates a total of the prediction residual signal transmitted from the inverse transforming means 105 (inverse transforming means 205) and the prediction signal transmitted from the compensating means 109 (compensating means 209) described later. In addition, when the mapping pixel signal, rather than the prediction residual signal, is transmitted as it is (in a case of a first block within a frame when an intra-prediction is used, for example), the adding processing is omitted. The mapping pixel signal obtained by the addition (or obtained directly where the adding processing is omitted) is transmitted to the inverse mapping means 160 (inverse mapping means 260) described later.

The difference means 107 calculates, in the unit block to be encoded, a difference between the mapping pixel signal in which the signal redundancy is reduced by the mapping means 150 described in detail later and the prediction signal transmitted from the compensating means 109 described later. The prediction residual signal, on the mapping pixel signal obtained by the subtraction, is transmitted to the transforming means 101.

The predicting means 108 determines, by an encoded pixel signal in a predetermined region (region corresponding to a reference source in the prediction information), out of the encoded pixel signals held in the memory 110, obtained by mapping by the mapping means 150 into the mapping pixel signal, the prediction information for approximating the mapping pixel signal to be encoded, which is obtained by mapping, by the mapping means 150, the input pixel signal to be encoded (pixel signal in a block to be encoded). The determined prediction information is transmitted to the compensating means 109 and the encoding means 103. In addition, a data flow where the prediction information is transmitted to the encoding means 103 is not shown in the figures.

As one example, when H.264 Intra-prediction (intra-prediction) is used, the mapping pixel signal is encoded individually in each Intra-prediction mode, and an Intra-prediction mode for minimizing a cost calculated from an encoding amount and a distortion amount is selected, which is used as the prediction information. When a motion prediction is used, a frame and coordinates to be referred to are searched, and these are used as the prediction information. In addition, the application of the intra-prediction or the motion prediction to the mapping pixel will be described together with the detailed description of the mapping means 150, etc.

The compensating means 109 (compensating means 209) generates the prediction signal in a region to be encoded (region to be decoded), by the prediction information transmitted from the predicting means 108 (decoding means 203) and the mapping pixel signal obtained by mapping the encoded pixel signal in a region, from which reference is made, by the mapping means 150 (mapping means 250), in the prediction information. In the encoding device 1, the prediction signal is transmitted to the difference means 107 and the adding means 106, and in the decoding device 2, the prediction signal is transmitted to the adding means 206.

Various operations including calculation of the mapping coefficient in the mapping means 150 (mapping means 250) will be described in detail below. In the calculation, when a similar pixel for a pixel in the block to be encoded (block to be decoded) is used to be selected from the encoded region (decoded region), it is possible to calculate the same mapping coefficient in either the encoding device 1 or the decoding device 2. Thus, it is not necessary to encode particular added information to be transferred from the encoding device 1 to the decoding device 2. In this case, the similar pixel is selected and used when evaluating the mapping coefficient, and therefore, it is possible to achieve reduction of the redundancy also when the mapping coefficient is applied to the pixel signal in the block to be encoded (block to be decoded) and to reduce an encoding amount because encoding the mapping coefficient is not necessary.

For the similar pixel, it is possible to use a pixel in an encoded (decoded) adjacent block relative to the block to be encoded (block to be decoded). This is based on the fact that the subject block and its adjacent block often have a similar color characteristic. Further, the adjacent block relative to the block to be processed may be changed depending on each item of prediction information used in the predicting means 108.

For example, when the predicting means 108 uses the Intra-prediction, the prediction information may be expressed as a prediction mode. In this case, it is possible to use a predetermined region related to a region indicated by the prediction mode as a reference source for the prediction. Specifically, when the prediction mode in the intra-prediction is either one of DC, PLANE, 4, 5, or 6, pixels in left and upper blocks are used as the similar pixel, when the Intra-prediction mode is 1 or 8, a pixel in a left block is used, and when the Intra-prediction mode is either one of 0, 3, or 7, a pixel in an upper block is used.

When the predicting means 108 uses the motion prediction, it is also possible to use a region related to the region indicated by the prediction information. Further, in addition, a predetermined pattern in accordance with a well-known method may be defined in advance to determine which of the intra-prediction or the motion prediction is used for each frame.

A unit used for calculating the mapping coefficient may be a unit block for processing the encoding (decoding), or may be a part of a unit block for processing. Alternatively, by using a region division adopting various well-known methods such as watershed, the same region as an adjacent pixel to the block to be encoded (block to be decoded) may be extracted or the same region as the adjacent block to the block to be encoded (block to be decoded) may be extracted and the extracted subject pixel in that region may be used.

Specifically, when the number of pixels included in the region indicated by the prediction information is small, a noise influence tends to be relatively large, and thus, it may be possible to enlarge the region with the region being the center until a predetermined number of pixels are reached. Reversely, when the number of pixels included in the region is large, it is more likely that a pixel having a different correlation between channels may be included, and thus, it may be possible to configure the region by solely using a pixel having a correlation matching that of a pixel closer to the block to be encoded.

Therefore, when the region that can be regarded as the same region in the region division is extracted, it may be possible that a few predetermined candidates for a size of the extracted region are defined, the mapping coefficient calculation or the encoding is actually attempted in each candidate, and in this state, the actual encoding is performed using a size that may minimize an encoding cost (encoding is performed to include the size information). A predetermined one size may be defined in advance by an experiment, etc., so that encoding the size information is not necessary. The size candidate or the one predetermined size may be defined by the intra-prediction and inter-prediction, respectively.

Further, whether or not the mapping coefficient calculation should be applied may be set depending on each region. For example, when the similar pixel is configured by a flat value, if (1) a previously set mapping coefficient is applied, or if (2) a mapping coefficient already calculated in a block adjacent to a block to be processed relative to the similar pixels is applied, then it is possible to decrease a calculation load and to decrease a difference from a transformation coefficient in the adjacent block, then it is possible to improve the encoding efficiency.

In addition, in the case of (1), processing for mapping may be omitted, and the process may be performed as the pixel signal, rather than the mapping pixel signal, even after the transforming means 101. Alternatively, completely the same, a mapping coefficient corresponding to an identity mapping may be previously set as the mapping coefficient to be applied. Further, in the case of (2), the precondition is that the adjacent block is also determined to be flat, and when a subject block having an adjacent pixel that may be determined to be flat is continued, the mapping coefficient calculated from an adjacent pixel in a subject block that is first determined to be flat is diverted as a mapping coefficient in a subject block subsequently continuously determined to be flat. Further, in addition, whether flat or not may be determined on the basis of the concentration of a predetermined ratio of pixels or more in a predetermined range in a similar pixel histogram, for example.

In the encoding device 1, the calculated mapping coefficient is applied to an input pixel signal to be encoded and to an encoded pixel signal which is held in the memory 110 and is located at a position to which the predicting means 108 and the compensating means 109 refer. The mapping pixel signal is evaluated in the applied range. Of the mapping pixel signals, the mapping pixel signal in the block to be encoded is transmitted to the difference means 107, the compensating means 109, and the predicting means 108.

In addition, the calculation of the mapping coefficient and the calculation of the mapping pixel signal under the coefficient are performed for each item of candidate prediction information applied in the predicting means 108 (the calculation is performed only for the defined prediction information at the decoding device 1 side). The pixel signal corresponding to the prediction information, out of the candidate prediction information items, that minimizes the cost calculated from an encoding amount and a distortion amount when encoding in the encoding means 103 is encoded as actual output from the encoding device 1, and at the same time, mapped inversely by the inverse mapping means 160 to the encoded pixel signal so as to be saved in the memory 110 so that the mapping means 150 is referable in the processing of following blocks to be encoded.

In the decoding device 2, the calculated mapping coefficient is first applied by the mapping means 250 to the already decoded pixel signal in a region from which the compensating means 209 defined by the prediction information generates the prediction signal, and the mapping pixel signal in the region from which the prediction signal is generated is evaluated. The compensating means 209 applies the prediction information to the mapping pixel signal in the region to obtain the prediction signal, and the prediction signal is added by the adding means 206 to the prediction residual signal so as to obtain the mapping pixel signal in the block to be decoded.

In the decoding device 2, when the calculated mapping coefficient is further applied, as an inverse mapping, by the inverse mapping means 260 to the mapping pixel signal in the block to be decoded, the pixel signal in the block to be decoded is evaluated to be output from the decoding device 2, and saved in the memory 210 to be referred to by the mapping means 250 in the processing of following blocks to be decoded.

As described above, in the encoding device 1, the mapping pixel signal in the subject block to which the mapping is applied, is transmitted from the mapping means 150 to the difference means 107, the compensating means 109, and the predicting means 108, and in the decoding device 2, the same mapping pixel signal is transmitted from the mapping means 250 to the compensating means 209. Further, apart from a flow of the transmitted data, the mapping pixel signal in the region from which the prediction is estimated, where the mapping pixel signal is required when the prediction information is applied to the subject block, is calculated individually by the mapping means 150 (mapping means 250) and provided to the predicting means 108 and the compensating means 109 (compensating means 209).

Further, as described above, in order that the pixel signal to which the inverse mapping is applied is used in the following subject block processing, in the encoding device 1, the pixel signal is held in the memory 110 from the inverse mapping means 160 and then transmitted to the mapping means 150, and in the decoding device 2, the pixel signal is held in the memory 210 from the inverse mapping means 260 and then transmitted to the mapping means 250 and output as the pixel signal.

FIG. 3 is a diagram for describing a specific application example of the mapping means 150, etc. In the description, as shown in (1), when the block to be encoded (block to be decoded) is B0, out of already encoded (decoded) blocks to which the pixel signal is referable when the block is encoded (decoded), that, which is located at the upper left of the B0, is a block A1, that, which is located above the B0, is a block A2, that, which is located at the upper right of the B0, is a block A3, and that, which is located at the left of the B0, is a block A4. In the example, when the blocks A1 to A4 are arranged relative to the block B0, it is assumed that the encoding (decoding) is performed within an image in order of raster scanning; however, another order may be possible. Further, one portion of the blocks A1 to A4 may include an unreferenced portion.

When the predicting means 108 adopts a prediction mode 0 (vertical direction prediction) of the intra-prediction, (2) is applied, and a pixel B2 in the lowest line in the processed block A2 is used, as a reference-use pixel adjacent to the block to be processed B0, for predicting the B0.

When (2) is applied, the mapping means 150 (mapping means 250) evaluates the mapping coefficient from all the pixels in the block A2. By using the mapping coefficient, the mapping means 150 transforms, at the encoding device 1 side, the pixel signal in a prediction-source region (region to be referred to for prediction) B2 and the block to be encoded B0 into the mapping pixel signal. Further, by using the mapping coefficient, the mapping means 250 transforms, at the decoding device 2 side, the pixel signal in the prediction-source region B2 into the mapping pixel signal.

Further, when (2) is applied, the compensating means 109 (compensating means 209) generates a prediction signal for the mapping pixel signal in the subject block B0 from the mapping pixel signal in the prediction-source region B2, in accordance with the prediction information of the intra-prediction prediction mode 0. In this case, at the encoding device 1 side, in particular, the mapping pixel signal in the prediction-source region B2 and the prediction-target region B0 is a mapping pixel signal mapped in the same space with the common mapping coefficient evaluated in the block A2. Therefore, even when the prediction to be initially assumed to be used in a fixed color space such as RGB is used in a space defined by a mapping relationship which is different depending on each block in the present invention, the prediction functions effectively to improve the encoding efficiency.

After the prediction signal is generated, in the encoding device 1, the prediction residual signal, relative to the mapping pixel signal of the subject block B0, as a difference between the mapping pixel signal in the subject block B0 and its prediction signal is calculated in the difference means 107, and passed onto the transforming means 101 and onward. Thereafter, the subject prediction residual signal is encoded in the encoding means 103, and at the same time, is converted into the mapping pixel signal reconfigured in the adding means 106, and is subjected to the inverse mapping by the mapping coefficient already evaluated by the mapping means 150 from the block A2 in the inverse mapping means 160 to generate a reconfigured pixel signal in the block B0, where the generated pixel signal is saved in the memory 110 to be referred to by the mapping means 150 in the following block to be processed.

Further, after the prediction signal is generated, in the decoding device 2, as a sum of the prediction residual signal of the mapping pixel signal of the subject block B0 and its prediction signal, the mapping pixel signal in the subject block B0 is obtained in the adding means 206, and further, when the mapping pixel signal is subjected to inverse mapping in the inverse mapping means 260 by using the mapping coefficient that is already evaluated in the mapping means 250 and calculated in the block A2, the reconfigured pixel signal in the subject block B0 is obtained to be output from the decoding device 2, and is held in the memory 210 to be referred to by the mapping means 250 in the following block to be processed.

Thus, a main portion of a signal flow when the B0 is encoded and decoded in (2) where the case of the prediction mode 0 is shown is summarized as follows:

<Main Flow when B0 is Encoded>
[10] Calculate a mapping coefficient from A2
[11] Map the pixel signal of B2 and B0 into the mapping pixel signal with the mapping coefficient of the A2
[12] Generate the prediction signal of the B0 from the mapping pixel signal of the B2 to obtain a difference therebetween, whereby the prediction residual signal for the mapping pixel signal of the B0 is calculated
[13] Encode by transforming and quantizing (together with the prediction information) the prediction residual signal of the B0

<Main Flow when B0 is Decoded>
[20] Calculate the mapping coefficient from A2
[21] Map the pixel signal of B2 into the mapping pixel signal by the mapping coefficient of the A2
[22] Generate the prediction signal of the B0 from the mapping pixel signal of the B2 and add it to the prediction residual signal of the B0 to calculate the mapping pixel signal of the B0
[23] Perform inverse mapping on the mapping pixel signal of the B0, by the mapping coefficient of the A2, to reconfigure the pixel signal of the B0

Thus, in the present invention, the mapping coefficient is evaluated from the encoded adjacent block A2 of the subject block B0 including the region B2 of the reference pixel used for prediction. The adjacent block A2 contacts the subject block B0, and thus, generally, the possibility is high that the color distribution is similar. Therefore, the possibility is high that the mapping coefficient evaluated from the A2 reduces the redundancy of the B0.

In addition, as described above, the mapping coefficient may be evaluated from only one portion of all the pixels in the block A2 rather than from all the pixels in the block A2; however, the one portion preferably includes the B2. Further, in the encoded (decoded) region to which reference can be made at the time of evaluation, when the mapping means 150 (mapping means 250) adopts the region division as an additional processing, for example, the mapping coefficient may be calculated by using (region obtained by adding the block A2 or the region B2 itself to) the region to be determined as identical in characteristic to the block A2 or the region B2 on the basis of a predetermined standard.

(3) is an example of a case where the prediction mode 1 (horizontal direction prediction) of the intra-prediction is applied in the predicting means 108. When a pixel B3 in the rightmost line in the A4 instead of the pixel B2 in the lowest line in the A2 in (2), i.e., a reference pixel region corresponding to the prediction mode 1, and the block A4 (left to the B0) instead of the block A2 (above the B0), i.e., the adjacent block including the reference pixel, is each used, the encoding and the decoding are possible where the prediction is applied in (3) in completely the same way as in (2).

(4) is an example of a case where the prediction mode 2 (DC prediction) of the intra-prediction is applied in the predicting means 108. When, instead of the lowest line B2 in the A2 in the case of (2), B4 made of the lowest line in the A2, the rightmost line in the A4, and a portion crossing the above, i.e., a reference pixel region corresponding to the prediction mode 2 and an adjacent block including the blocks A1, A2, and A4 (upper left to, above, and left to the B0), instead of the block A2 (above the B0), i.e., the reference pixel are each used, the encoding and the decoding are possible while the prediction is applied in (4) in completely the same way as in (2).

In addition, although not shown in FIG. 3, it is possible to apply the prediction in completely the same way as when another prediction mode of the intra-prediction is used. That is, when the prediction mode 4, 5 or 6 is concerned, the reference pixel and the adjacent block similar to (4) may be used, and when the prediction mode 8 is concerned, the reference pixel and the adjacent block similar to (3) may be used, and when the prediction mode 3 or 7 is concerned, the reference pixel and the adjacent block similar to (2) may be used.

Further, also when the predicting means 108 uses the motion prediction (inter-prediction), as shown in (5), a region indicated by the prediction information by the motion prediction may be used as the reference pixel and the reference block (instead of the adjacent block). For example, when the subject block B0 in a frame F0 is predicted by a block B1 in another frame F1, information on the reference frame and the reference block is encoded as the prediction information, and when the block B1 is handled as the A2 (subject to mapping coefficient calculation) and B2 (subject to calculation of the mapping pixel as the prediction-source region) in (2), prediction, encoding, and decoding can be applied.

In addition, when the motion prediction is used, if the above-described block B1 in (5) is set as a larger predetermined block including therein a referenced block, rather than the referenced block itself, resistance to noise may be provided.

Further, when the predicting means 108 actually determines which prediction mode is applied from the various prediction modes when a predetermined intra-prediction such as the intra-prediction is applied, the predicting means 108 actually performs encoding one by one in all the prediction modes, as described above, and then selects a prediction mode in which a cost calculated from the encoding amount and the distortion amount can be minimized. Also when the motion prediction is used, the predicting means 108 actually performs encoding one by one in all the prediction modes in a predetermined range and then similarly selects a prediction mode in which the cost can be minimized.

Further, also when a 4×4 intra-prediction (prediction modes 0 to 8) is used, the size of a unit block to be encoded may not necessarily be 4×4, and another intra-prediction may be used in another size. Moreover, as described above, when the intra-prediction is used and the prediction cannot be applied because of a first block within a frame, the first block is not subjected to mapping, inverse mapping, nor prediction, etc., and directly subjected to transformation, quantization, and encoding as a pixel signal, or the mapping and inverse mapping are applied and the prediction is not applied, and the mapping coefficient (may be a coefficient of the identity mapping) is encoded and then transformed, quantized, and encoded as a mapping pixel signal, and the same processing is performed at the decoding side, and the following blocks are subjected to the processing described above.

Further, the mapping means 150, etc., evaluate the mapping coefficient for reducing the correlation between signals in a predetermined color space by the principal component transformation and applies the evaluated mapping coefficient as mapping and inverse mapping, and a specific application procedure is as follows. First, to calculate the mapping coefficient, the input pixel signal is separated into m signals. The type or number of signals to be separated is arbitrary, and as one example, a signal in a color space such as an RGB signal, a YUV signal, or a YCbCr signal may be used. If the input pixel signal is previously configured by a predetermined color space, then the color space may be used as it is.

Next, this is expressed in a matrix form where N pixels are a column and m separated signals are each a row. As a specific example, a matrix P where each of N pixels of an RGB signal is expressed by $R_i$, $G_i$, $B_i$ (i=1, 2, ..., N) (m=3) is expressed by the following equation (Equation 1):

[Equation 1]

$$P = \begin{pmatrix} R_1 & G_1 & B_1 \\ R_2 & G_2 & B_2 \\ \vdots & \vdots & \vdots \\ R_N & G_N & B_N \end{pmatrix} \quad \text{(Equation 1)}$$

In addition, the each pixel $R_i$, $G_i$, and $B_i$ are to be subjected to average subtraction in advance so that an average value of the N is zero. That is, when N input pixels of the original RGB signal is $r_i$, $g_i$, $b_i$ (i=1, 2, ..., N), the relationship of Equation 2 is established:

[Equation 2]

$$R_i = r_i - \frac{1}{N}\sum_{j=1}^{N} r_j \quad \text{(Equation 2)}$$

$$G_i = g_i - \frac{1}{N}\sum_{j=1}^{N} g_j$$

$$B_i = b_i - \frac{1}{N}\sum_{j=1}^{N} b_j$$

Subsequently, the matrix P calculates a product with a transposed matrix $P^t$ as a matrix A (Equation 3). t represents a transpose operation.

[Equation 3]

$$A = P^t P \quad \text{(Equation 3)}$$

At this time, the matrix A is a symmetric matrix where the numbers of columns and rows are each the number m of separated signal elements. Therefore, it is possible to break down the matrix A into a product of matrices as in the following equation (Equation 4):

[Equation 4]

$$A = U\Sigma V^t \quad \text{(Equation 4)}$$

It should be noted that U and V denote an orthogonal matrix of m×m, and Σ denotes a diagonal matrix of m×m where a singular value $\sigma_i$ (1≤i≤rankA) of the matrix A is arranged in descending order. The singular value $\sigma_i$ is the square of an eigenvalue $\lambda_i$ of $A^t A$. As a specific procedure, the eigenvalue of $A^t A$ is first evaluated and then the singular value is calculated. Next, by using the fact that the orthogonal matrices U and V are, from its definition, $U^t U=I$ and $V^t V=I$ (I is a unit matrix), (Equation 5) is obtained.

[Equation 5]

$$A^t A V = V\Sigma^2 \quad \text{(Equation 5)}$$

Therefore, as indicated by the following equation (Equation 6), a column vector $v_i$ of V can be evaluated as an eigenvector corresponding to an eigenvalue $\sigma_i^2$ of $A^t A$. In addition, the quantization parameter in the above-described quantizing means 102 may be defined in accordance with the eigenvalue $\sigma^2$ corresponding to the information amount in the space axis.

[Equation 6]

$$A^t A v_i = \sigma_i^2 v_i \quad \text{(Equation 6)}$$

Finally, an orthogonal matrix $V^t$ is applied, as a mapping coefficient, to a pixel to be encoded Q, and a mapping pixel signal Q' is calculated (Equation 7).

[Equation 7]

$$Q' = QV^t \quad \text{(Equation 7)}$$

Further, the mapping coefficient used in the inverse mapping means 160, 260 is given by the orthogonal matrix U, and by using the following equation (Equation 8), the pixel signal Q is calculated from the mapping pixel signal Q'. At this time, further, when it is ensured that the average is not zero by using an inverse operation of the (Equation 2), a final pixel signal is evaluated. That is, in the mapping coefficient, information for shifting the average of (Equation 2) is also to be included.

[Equation 8]

$$Q = Q'U \quad \text{(Equation 8)}$$

For example, in the example of (2) in FIG. 3, when the matrix P is evaluated from the pixel signal in the block A2 and applied to the block B0 where the pixel to be encoded Q exists, its mapping pixel signal Q' is obtained.

REFERENCE SIGNS LIST

1 ... Image encoding device, 101 ... Transforming means, 102 ... Quantizing means, 103 ... Encoding means, 104 ... (Encoding-side) inverse quantizing means, 105 ... (Encoding-side) inverse transforming means, 106 ... (Encoding-side) adding means, 107 ... Difference means, 108 ... Predicting means, 109 ... (Encoding-side) compensating means, 110 ... (Encoding-side) memory, 150 ... (Encoding-side) mapping means, 160 ... (Encoding-side) inverse mapping means, 2 ... Image decoding device, 203 ... Decoding means, 204 ... (Decoding-side) inverse quantizing means, 205 ... (Decoding-side) inverse transforming means, 206 ... (Decoding-side) adding means, 209 ... (Decoding-side) compensating means, 210 ... (Decoding-side) memory 210, 250 ... (Decoding-side) mapping means, 260 ... (Decoding-side) inverse mapping means

The invention claimed is:

1. An image encoding device for encoding, for each unit block, a pixel signal of a pixel to be encoded, where the pixel is configured by a predetermined color space, into a form of a mapping pixel signal mapped into a space for reducing a correlation between signals, the device comprising:

mapping means for applying, to a pixel signal to be encoded, a mapping coefficient for reducing a correlation between the signals, where the mapping coefficient is calculated from an encoded pixel signal, to obtain a mapping pixel signal;

predicting means for determining prediction information for predicting a mapping pixel signal to be encoded, from the mapping pixel signal of the encoded pixel signal;

compensating means for generating a prediction signal of the mapping pixel signal to be encoded, on the basis of the prediction information;

difference means for performing difference processing between the mapping pixel signal to be encoded and a prediction signal thereof to obtain a prediction residual signal;

transforming means for performing an orthogonal transformation on the prediction residual signal to obtain a transformation coefficient;

quantizing means for quantizing the transformation coefficient in accordance with the mapping coefficient to obtain a quantization value;

encoding means for encoding the quantization value and the prediction information;

inverse quantizing means for performing an inverse quantization on the quantization value to obtain a transformation coefficient;

inverse transforming means for performing inverse orthogonal transformation on the transformation coefficient to obtain a prediction residual signal;

adding means for adding the prediction residual signal and the prediction signal to obtain an encoded mapping pixel signal; and inverse mapping means for applying the mapping coefficient, as inverse mapping, to the encoded mapping pixel signal to obtain an encoded pixel signal, wherein the mapping means calculates the mapping coefficient from an encoded pixel signal in a predetermined region including a region to which the prediction information refers, and applies the mapping coefficient to the encoded pixel signal in the predetermined referred region when the mapping coefficient is applied to the pixel signal to be encoded, and the predicting means predicts the mapping pixel signal to be encoded, from the encoded mapping pixel signal in the predetermined region by the applied mapping coefficient.

2. The image encoding device according to claim 1, wherein the mapping means calculates the mapping coefficient on the basis of a principal component analysis.

3. The image encoding device according to claim 2, wherein the quantizing means defines a quantization parameter in each space of the mapping pixel signal on the basis of an eigenvalue in the principal component analysis in each space.

4. The image encoding device according to claim 1, wherein the predicting means determines the prediction information by determining a prediction mode in a predetermined intra-prediction method, the mapping means calculates the mapping coefficient from an encoded unit block including a region defined as a reference pixel by the prediction mode, for each prediction mode in the predetermined intra-prediction method and applies the mapping coefficient to the pixel signal to be encoded and a region of the reference pixel, and the predicting means determines the prediction information for predicting the mapping pixel signal to be encoded, from the mapping pixel signal in a region of the reference pixel by the applied mapping coefficient.

5. The image encoding device according to claim 4, wherein the mapping means calculates the mapping coefficient from: a region of an encoded pixel having the same pixel distribution in predetermined standard as that of the encoded unit block including the region determined as a reference pixel by the prediction mode; and the unit block, for each prediction mode in the predetermined intra-prediction method, and applies the mapping coefficient to regions of the pixel signal to be encoded and the reference pixel.

6. The image encoding device according to claim 5, wherein the mapping means defines, by using a region division, the region of an encoded pixel having the same pixel distribution in terms of the predetermined standard.

7. The image encoding device according to claim 1, wherein the predicting means determines, as the prediction information, a prediction mode enabling minimization of an encoding cost from each of the prediction modes in the predetermined intra-prediction method.

8. The image encoding device according to claim 1, wherein the predicting means determines a reference frame and a reference block in the reference frame by an inter-prediction to thereby determine the prediction information, and the mapping means calculates a mapping coefficient by a predetermined block including therein the reference block in the reference frame.

9. The image encoding device according to claim 1, wherein the mapping means uses a predetermined mapping coefficient by omitting calculation when a region used for the calculation of the mapping coefficient is flat, or diverts the mapping coefficient calculated for an initial block when a case where the region used for the calculation of the mapping coefficient is flat is continued in a unit of block to be encoded, to a mapping coefficient for a following block.

10. An image decoding device for decoding, for each unit block, information encoded by the image encoding device according to claim 1, into the pixel signal configured by the predetermined color space, the device comprising:

decoding means for decoding the encoded quantization value and the prediction information;

decoding-side inverse quantizing means for performing an inverse quantization on the quantization value to obtain a transformation coefficient;

decoding-side inverse transforming means for performing inverse orthogonal transformation on the transformation coefficient to obtain a prediction residual signal;

decoding-side compensating means for generating a prediction signal of a mapping pixel signal for a pixel signal to be decoded, from a mapping pixel signal obtained from the decoded pixel signal and the prediction information;

decoding-side adding means for adding the prediction signal and the prediction residual signal to obtain the decoded mapping pixel signal;

decoding-side mapping means for calculating the mapping coefficient from the decoded pixel signal in a predetermined region including a region to which the prediction information refers, and decoding-side inverse mapping means for applying the calculated mapping coefficient, as inverse mapping, to the decoded mapping pixel signal to obtain the decoded pixel signal, wherein the decoding-side mapping means applies the mapping coefficient to the decoded pixel signal in the predetermined region to obtain the mapping pixel signal that is used together with the prediction information when the decoding-side compensating means generates the prediction signal and is obtained from the decoded pixel signal.

\* \* \* \* \*